(12) United States Patent
Kikuchi et al.

(10) Patent No.: US 9,041,872 B2
(45) Date of Patent: May 26, 2015

(54) SWITCHING LIQUID CRYSTAL PANEL AND DISPLAY DEVICE

(75) Inventors: Ryoh Kikuchi, Osaka (JP); Hiroshi Fukushima, Osaka (JP); Tomoo Takatani, Osaka (JP); Kimitaka Nomura, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 360 days.

(21) Appl. No.: 13/812,937

(22) PCT Filed: Jul. 25, 2011

(86) PCT No.: PCT/JP2011/066793
§ 371 (c)(1),
(2), (4) Date: Jan. 29, 2013

(87) PCT Pub. No.: WO2012/014827
PCT Pub. Date: Feb. 2, 2012

(65) Prior Publication Data
US 2013/0128163 A1     May 23, 2013

(30) Foreign Application Priority Data

Jul. 29, 2010   (JP) .................................. 2010-170943

(51) Int. Cl.
*G02F 1/1343*   (2006.01)
*G02B 27/22*    (2006.01)
(Continued)

(52) U.S. Cl.
CPC ........ *G02F 1/13439* (2013.01); *G02B 27/2214* (2013.01); *G02F 1/1347* (2013.01);
(Continued)

(58) Field of Classification Search
CPC .................................................... G02F 1/13439
See application file for complete search history.

(56) References Cited

U.S. PATENT DOCUMENTS

2009/0015732 A1*  1/2009  Yabuta et al. ..................... 349/1
2011/0001894 A1*  1/2011  Owaku et al. ................... 349/15

FOREIGN PATENT DOCUMENTS

| JP | H07-261119  | 10/1995 |
| JP | 2003-228072 | 8/2003  |

(Continued)

OTHER PUBLICATIONS

International Search Report for PCT/JP2011/066793, mailed Aug. 23, 2011.

*Primary Examiner* — Timothy L Rude
(74) *Attorney, Agent, or Firm* — Nixon & Vanderhye, P.C.

(57) ABSTRACT

Provided is a switching liquid crystal panel and a display device that have novel structures that are capable of preventing luminous regions from appearing in the light transmitting parts, in the vicinities of boundaries thereof with the light shielding parts. The switching liquid crystal panel includes a pair of substrates (26a, 26b) having a twisted nematic type liquid crystal layer (24) interposed therebetween, and a plurality of light shield forming electrodes (30) that are formed on at least one of the pair of substrates (26a, 26b) and that form light shielding parts (40) of a parallax barrier (16) in cooperation with a counter electrode (34) when a voltage is applied, the counter electrode (34) being is opposed to the light shield forming electrodes (30) with the liquid crystal layer (24) interposed therebetween. A rubbing direction for an alignment film (36a) provided on the substrate (26a) side on which the light shield forming electrodes (30) are formed is at an angle of 45° or less to a lengthwise direction of the light shield forming electrodes (30).

8 Claims, 8 Drawing Sheets

(51) Int. Cl.
G02F 1/1347 (2006.01)
G02F 1/1335 (2006.01)
G02F 1/1337 (2006.01)

(52) U.S. Cl.
CPC ..... *G02F1/133512* (2013.01); *G02F 1/133784* (2013.01); *G02F 1/134309* (2013.01); *G02F 2201/124* (2013.01)

(56) References Cited

FOREIGN PATENT DOCUMENTS

| | | |
|---|---|---|
| JP | 2003-279924 | 10/2003 |
| JP | 2004-264760 | 9/2004 |
| JP | 2005-134663 | 5/2005 |
| JP | 2006-47507 | 2/2006 |

\* cited by examiner

γ : 63°   δ2 : 63°   δ1 : 27°   β : 27°   α : 63°

SWITCHING LIQUID CRYSTAL PANEL AND DISPLAY DEVICE

This application is the U.S. national phase of International Application No. PCT/JP2011/066793 filed 25 Jul. 2011 which designated the U.S. and claims priority to JP Patent Application No. 2010-170943 filed 29 Jul. 2010, the entire contents of each of which are hereby incorporated by reference.

TECHNICAL FIELD

The present invention relates to a switching liquid crystal panel and a display device.

BACKGROUND ART

Conventionally, the parallax barrier method has been known as a stereoscopic image displaying method that does not require the use of specific glasses (a method of showing stereoscopic images to an observer). For example, JP2004-264760A (Patent Document 1) discloses a stereoscopic video image display device that displays a barrier in which apertures that allow light to pass therethrough and light shielding parts that block light are provided in a stripe form, on a switching liquid crystal panel.

Incidentally, in order to improve the quality of stereoscopic images in the stereoscopic video image display device disclosed in Patent Document 1, it is necessary to increase the contrast of the barrier displayed on the switching liquid crystal panel. In the switching liquid crystal panel provided in the stereoscopic video image display device disclosed in Patent Document 1, the light shielding parts are formed by applying a driving voltage. Therefore, in order to increase the contrast of the barrier, it is necessary to increase the driving voltage.

The stereoscopic video image display device disclosed in Patent Document 1, however, has the following problem. In the stereoscopic video image display device, an electrode is provided over an entirety of one of substrates that have a liquid crystal layer interposed therebetween, and on the other substrate, electrodes are provided at positions except for the positions where the apertures are to be formed. Therefore, on an alignment film on the other substrate side, recesses are formed due to the presence/absence of the electrodes. The alignment film is subjected to rubbing, but peripheral portions of bottom faces of the recesses would not be subjected to rubbing sufficiently. In this case, liquid crystal molecules positioned at the peripheral portions of bottoms of the recesses are not aligned in the rubbing direction. Therefore, upon application of a voltage, directions of the liquid crystal molecules positioned at the peripheral portions of bottoms of the recesses tend to change easily. As a result, regions that look bright due to light that has come from a backlight provided behind and passed through the switching liquid crystal panel (hereinafter referred to as "luminous regions") appear in portions of the apertures in the vicinities of boundaries with the light shielding parts.

DISCLOSURE OF THE INVENTION

It is an object of the present invention to provide a switching liquid crystal panel and a display device that have novel structures that are capable of preventing luminous regions from appearing in the light transmitting parts, in the vicinities of boundaries thereof with the light shielding parts.

A switching liquid crystal panel of the present invention is a switching liquid crystal panel capable of displaying a parallax barrier in a stripe form in which light transmitting parts that transmit light and light shielding parts that block light are formed alternately, and the switching liquid crystal panel includes: a pair of substrates; a twisted nematic type liquid crystal layer interposed between the pair of the substrates; a counter electrode formed on one of the pair of the substrates; a plurality of light shield forming electrodes formed on the other one of the pair of the substrates, the light shield forming electrodes forming the light shielding parts in cooperation with the counter electrode when a voltage is applied; and alignment films provided on the pair of the substrates, respectively, wherein a rubbing direction for the alignment film on the substrate having the light shield forming electrodes thereon is at an angle of 45° or less to a lengthwise direction of the light shield forming electrodes.

With the switching liquid crystal panel of the present invention, it is possible to prevent luminous regions from appearing in the light transmitting parts, in the vicinities of boundaries thereof with the light shielding parts.

EMBODIMENTS FOR CARRYING OUT THE INVENTION

Figure 1:
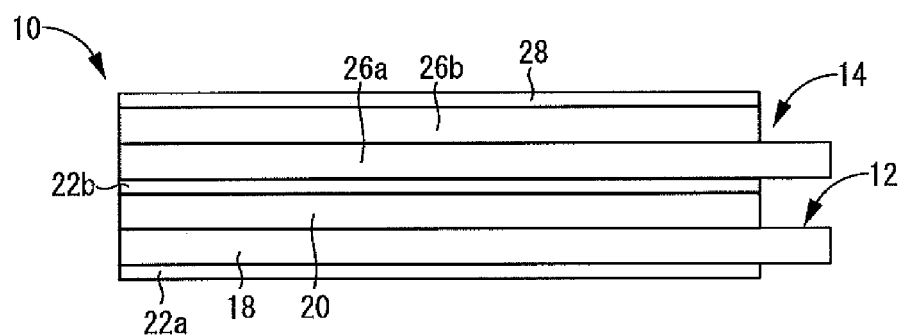
FIG. 1 is a cross-sectional view showing a schematic configuration of a display device as Embodiment 1 of the present invention.

A switching liquid crystal panel according to one embodiment of the present invention is a switching liquid crystal panel that is capable of displaying a parallax barrier in a stripe form in which light transmitting parts that transmit light and light shielding parts that block light are formed alternately, and the switching liquid crystal panel includes: a pair of substrates; a twisted nematic type liquid crystal layer interposed between the pair of the substrates; a counter electrode formed on one of the pair of the substrates; a plurality of light shield forming electrodes formed on the other one of the pair of the substrates, the light shield forming electrodes forming the light shielding parts in cooperation with the counter electrode when a voltage is applied; and alignment films provided on the pair of the substrates, respectively, wherein a rubbing direction for the alignment film on the substrate having the light shield forming electrodes thereon is at an angle of 45° or less to a lengthwise direction of the light shield forming electrodes (first configuration relating to the switching liquid crystal panel).

In the first configuration relating to the switching liquid crystal panel, desired rubbing can be performed with respect to an entirety of the alignment film provided on the substrate on which the light shield forming electrodes are formed. This makes it possible to align, in the rubbing direction, liquid crystal molecules provided at positions that are in regions that are to be light transmitting parts (region where light shield forming electrodes are not formed), and in the vicinities of boundaries thereof with regions that are to be light shielding parts (regions where the light shield forming electrodes are formed), in the alignment film provided on the substrate on which the light shield forming electrodes are formed. This consequently causes the liquid crystal molecules to be not easily influenced by the applied voltage.

Therefore, with the first configuration relating to the switching liquid crystal panel, it is possible to prevent the appearance of a luminous region in the light transmitting parts, at boundaries thereof with the light shielding parts.

A second configuration relating to the switching liquid crystal panel is the first configuration relating to the switching liquid crystal panel wherein the plurality of the light shield forming electrodes are connected with one another at least at each of ends thereof on one side in the lengthwise direction. In such a configuration, the number of lines required for applying a voltage is reduced. This consequently allows the switching liquid crystal panel to be manufactured easily.

A third configuration relating to the switching liquid crystal panel is the first or second configuration relating to the switching liquid crystal panel wherein the counter electrode is formed over an entirety of a region where the parallax barrier is displayed on the substrate. In this configuration, the counter electrode can be formed easily.

A fourth configuration relating to the switching liquid crystal panel is the first or second configuration relating to the switching liquid crystal panel wherein the plurality of the light shield forming electrodes are formed on each of the pair of the substrates; and the light shield forming electrodes formed on one of the pair of the substrates, and the light shield forming electrodes formed on the other one of the pair of the substrates, when being projected in the direction in which the pair of the substrates are opposed, cross orthogonally in the projections. In this configuration, the direction in which the light transmitting parts and the light shielding parts are arranged can be switched between the vertical direction and the horizontal direction of the substrates.

A fifth configuration relating to the switching liquid crystal panel is the fourth configuration relating to the switching liquid crystal panel wherein a plurality of auxiliary electrodes are formed on each of the pair of the substrates in such a manner that the auxiliary electrodes and the light shield forming electrodes are arranged alternately; and the counter electrode formed on the other one of the substrates so as to form the light shielding parts in cooperation with the light shield forming electrodes formed on the one of the substrates includes the light shield forming electrodes and the auxiliary electrodes formed on the other one of the substrates. In this configuration, a configuration for switching the direction in which the light transmitting parts and the light shielding parts are arranged to the vertical direction and the horizontal direction of the substrates can be realized easily.

A sixth configuration relating to the switching liquid crystal panel is the fifth configuration relating to the switching liquid crystal panel wherein, in each of the pair of the substrates, the plurality of the light shield forming electrodes are connected with one another at their ends on one side in the lengthwise direction; and the plurality of the auxiliary electrodes are connected with one another at their ends on the other side in the lengthwise direction. In this configuration, the number of lines required for applying a voltage is reduced. This consequently allows the switching liquid crystal panel to be manufactured easily.

A display device according to one embodiment of the present invention includes: the switching liquid crystal panel according to one embodiment of the present invention; and a display main panel for displaying an image (first configuration relating to the display device).

A second configuration relating to the display device is the first configuration relating to the display device wherein the display main panel is a transmission-type liquid crystal panel. In this configuration, either of the switching liquid crystal panel and the display main panel may be positioned on the front side. This consequently increases the degree of freedom in the design of the display device.

Hereinafter, more specific embodiments of the present invention are explained with reference to the drawings. The drawings referred to hereinafter show, in a simplified manner, only principal members needed for explaining the present invention, among constituent members of embodiments of the present invention, for convenience of explanation. Therefore, the switching liquid crystal panel and the display device according to the present invention may include arbitrary constituent members that are not shown in the drawings that are referred to in the present specification. Further, the dimensions of the members shown in the drawings do not necessarily faithfully reflect actual dimensions of constituent members, dimensional ratios of the members, etc.

[Embodiment 1]

FIG. 1 shows a display device 10 as Embodiment 1 of the present invention relating to a display device. The display device 10 includes a display main panel 12, and a switching liquid crystal panel 14 as Embodiment 1 of the present invention relating to a switching liquid crystal panel. In the display device 10, an image for the right eye and an image for the left eye, which are divided into stripes, are displayed on the display main panel 12 in such a manner that the stripes of one image and the stripes of the other image are arranged alternately, so that the image for the right eye and the image for the left eye are shown to an observer via a parallax barrier 16 (see FIG. 6) displayed on the switching liquid crystal panel 14. This allows only the image for the right eye to reach the right eye of the observer, and allows only the image for the left eye to reach the left eye of the observer. As a result, the observer can view a stereoscopic image (three-dimensional image), without using glasses. In the case where the parallax barrier 16 is not displayed on the switching liquid crystal panel 14, a planar image (two-dimensional image) may be displayed on the display main panel 12, so that the observer is allowed to view the planar image.

More specifically, the display main panel 12 is a conventionally known transmission-type liquid crystal panel. To briefly explain, the display main panel 12 includes a liquid crystal layer that is not shown, an active matrix substrate 18 provided on one side in the thickness direction of the liquid crystal layer, and a counter substrate 20 provided on the other side in the thickness direction of the liquid crystal layer. The active matrix substrate 18 has a greater dimension in the transverse direction (the horizontal direction in FIG. 1) than that of the counter substrate 20.

Figure 2:
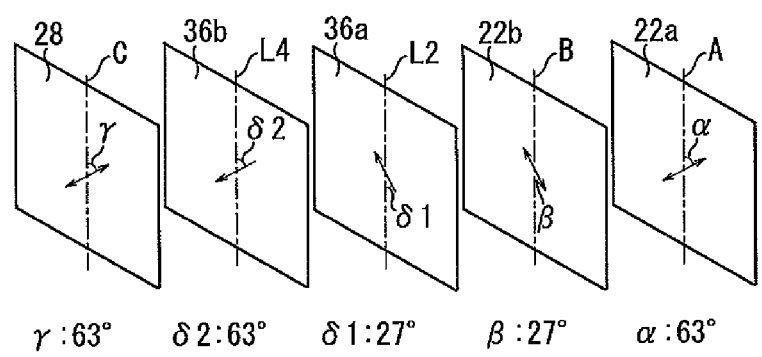
FIG. 2 is an explanatory view that explains a direction of an optical axis in the display device shown in FIG. 1

Polarizers 22a and 22b are arranged on a side of the active matrix substrate 18 and a side of the counter substrate 20 opposite to the liquid crystal layer, respectively, in states of being bonded thereto, respectively. The polarizers 22a and 22b are rectangular in shape. As shown in FIG. 2, an angle α formed between the polarization axis of the polarizer 22a and a reference line A parallel with one side of the polarizer 22a is set at 63°. An angle β formed between the polarization axis of the polarizer 22b and a reference line B parallel with one side of the polarizer 22b is set at 27°. The reference lines A and B are set parallel with each other.

Though not illustrated in the drawings, alignment films are provided on the active matrix substrate 18 and the counter substrate 20, respectively. The alignment films are rectangular in shape. An angle formed between a reference line extended in the rubbing direction for the alignment film on the active matrix substrate 18 and a reference line parallel with one side of the alignment film is set at 63°. An angle formed between a reference line extended in the rubbing direction for the alignment film on the counter substrate 20 and the reference line parallel with one side of the alignment film is set at 27°. The reference line parallel with one side of the alignment film is set parallel with the reference line A.

In such a display main panel 12, image data corresponding to an image to be displayed are input to the active matrix substrate 18 via lines (not shown) such as FPC (flexible printed circuit). Thus, images are displayed on the display main panel 12. In the case where a stereoscopic image is to be displayed, an image for the left eye and an image for the right eye, which are divided into stripes, are displayed in a display region, which is not illustrated, in such a manner that the stripes of one image and the stripes of the other image are arranged alternately. In the case where a planar image is displayed, the planar image is displayed in the display region.

On one side in the thickness direction of the display main panel 12, a backlight, which is not illustrated in the drawings, is provided. A conventionally known backlight can be used as the backlight.

On the other side in the thickness direction of the display main panel 12, the switching liquid crystal panel 14 is provided. The switching liquid crystal panel 14 includes a liquid crystal layer 24, and a pair of substrates 26a and 26b arranged so that the liquid crystal layer 24 is interposed therebetween, as shown in FIG. 3.

The liquid crystal layer 24 is a twisted nematic type liquid crystal layer. The substrates 26a and 26b are low-alkali glass substrates. The size and shape of the substrate 26a are approximately identical to those of the active matrix substrate 18. The substrate 26a is bonded to the polarizer 22b. The size and shape of the substrate 26b are approximately identical to those of the counter substrate 20.

On a side of the substrate 26b opposite to the liquid crystal layer 24, a polarizer 28 (see FIG. 1) is arranged in a state of being bonded to the substrate 26b. The polarizer 28 is rectangular in shape. As shown in FIG. 2, an angle γ formed between the polarization axis of the polarizer 28 and a reference line C parallel with one side of the polarizer 28 is set at 27°. The reference line C is set parallel to the reference line A.

Figure 3:
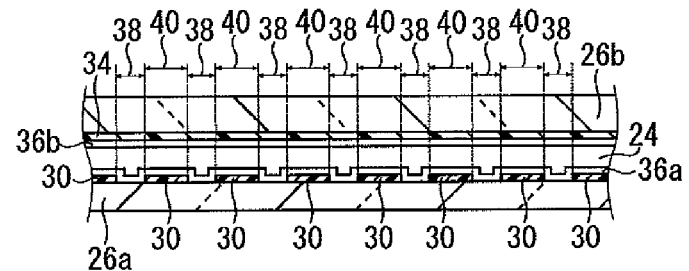
FIG. 3 is a cross-sectional view of the display device shown in FIG. 1, taken along, and viewed in the direction indicated by, an arrow line III-III shown in FIG. 4.
Figure 4:
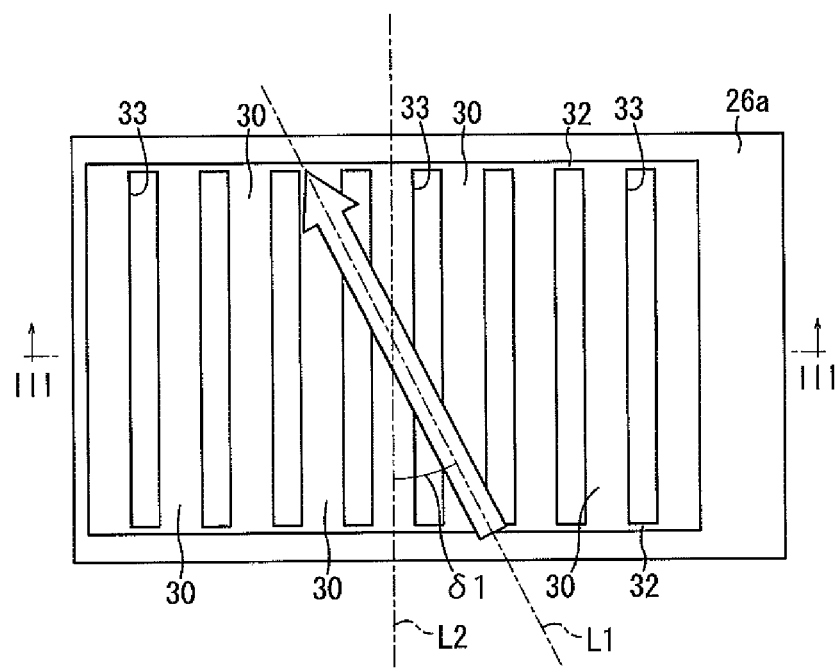
FIG. 4 is a plan view showing relationship between electrodes provided on one substrate as a component of the display device shown in FIG. 1 and a rubbing direction for an alignment film.

On the substrate 26a, a plurality of light shield forming electrodes 30 are formed, as shown in FIGS. 3 and 4. It should be noted that in FIG. 4, only nine light shield forming electrodes 30 are formed, for facilitation of understanding, but much more light shield forming electrodes 30 are formed actually.

Each light shield forming electrode 30 is formed so as to extend in the vertical direction of the substrate 26a (the longitudinal direction of FIG. 4), in an approximately uniform width. Thus, each light shield forming electrode 30 has a longitudinally long rectangular shape as a whole.

A plurality of the light shield forming electrodes 30 are arranged at equal intervals in the horizontal direction of the substrate 26a (the transversal direction of FIG. 4). At the ends of each light shield forming electrode 30 in the lengthwise direction, joint electrodes 32 are integrally formed, each of which extends in the horizontal direction of the substrate 26a in an approximately uniform width. Thus, the light shield forming electrodes 30 and the joint electrodes 32 are connected electrically.

As each of the light shield forming electrodes 30 and the joint electrodes 32, a conventionally known ITO (indium tin oxide) film can be used.

Figure 5:
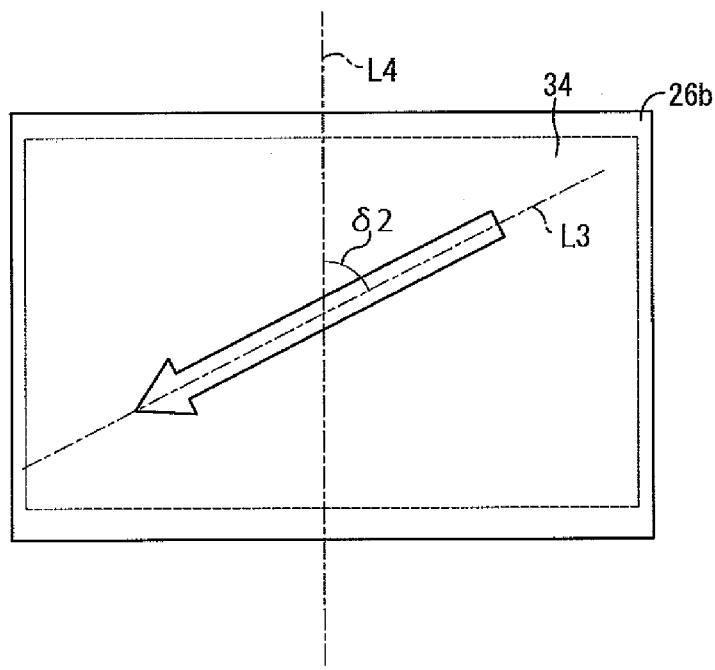
FIG. 5 is a plan view showing relationship between electrodes provided on the other substrate as a component of the display device shown in FIG. 1 and a rubbing direction for an alignment film.

On the substrate 26b, a counter electrode 34 is formed, as shown in FIGS. 3 and 5. The counter electrode 34 is formed over an entirety of a region where the parallax barrier 16 (see FIG. 6) is displayed on the substrate 26b. As the counter electrode 34, a conventionally known ITO film can be used.

On the substrates 26a and 26b, alignment films 36a and 36b are formed, respectively. As the alignment films 36a and 36b, conventionally known polyimide resin films can be used.

The alignment film 36a is formed so as to cover the plurality of light shield forming electrodes 30 and the joint electrodes 32. An angle δ1 formed between a reference line L1 extending in a rubbing direction (a direction indicated by a void arrow mark shown in FIG. 4) for the alignment film 36a and a reference line L2 extending in the lengthwise direction of the light shield forming electrode 30 formed on the substrate 26a is set at 27°, as shown in FIG. 2. The reference line L2 is set parallel with the reference line A.

The alignment film 36b is formed so as to cover the counter electrode 34. An angle δ2 formed between a reference line L3 extending in a rubbing direction (a direction indicated by a void arrow mark shown in FIG. 5) for the alignment film 36b and a reference line L4 parallel with one side of the substrate 26b is set at 63°, as shown in FIG. 2. The reference line L4 is set parallel with the reference line A.

Figure 6:
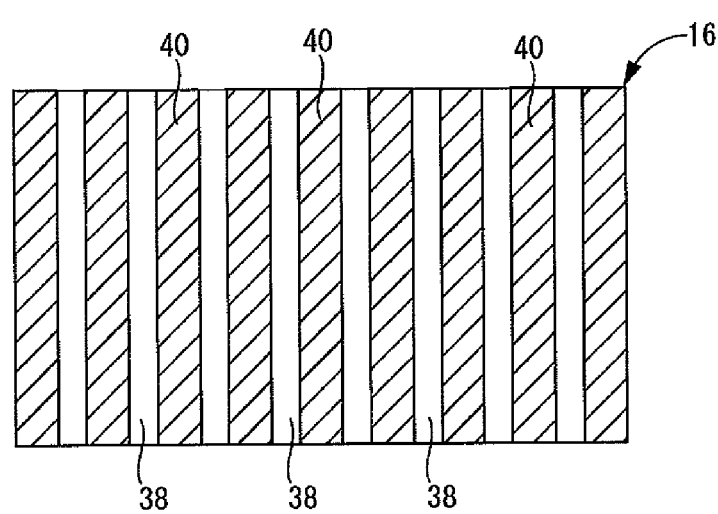
FIG. 6 is an explanatory view showing a parallax barrier displayed by the switching liquid crystal panel of the display device shown in FIG. 1.

In this display device 10, when a driving voltage is applied to the switching liquid crystal panel 14, the direction of liquid crystal molecules positioned between the light shield forming electrodes 30 and the counter electrode 34 changes. Thus, the parallax barrier 16 as shown in FIG. 6 is displayed on the switching liquid crystal panel 14. The parallax barrier 16 is composed of light transmitting parts 38 that transmit light and light shielding parts 40 that block light which are formed alternately in the horizontal direction of the switching liquid crystal panel 14.

Here, in the present embodiment, the angle δ1 formed between the reference line L1 extending in the rubbing direction for the alignment film 36a and the reference line L2 extending in the lengthwise direction of the light shield forming electrode 30 is set at 27°. This allows desired rubbing to be performed even to portions that are in regions that are to be the light transmitting parts 38 and are in the vicinities of boundaries with regions that are to be the light shielding parts 40. In other words, the desired rubbing can be performed even to portions that are in regions where neither the light shield forming electrodes 30 nor the joint electrodes 32 is formed (hereinafter these regions are referred to as "apertures 33"), and are in the vicinities of boundaries with regions where the light shield forming electrodes 30 are formed. As a result, liquid crystal molecules provided at positions that are in the apertures 33 and are in the vicinities of boundaries thereof with the light shield forming electrodes 30 can be aligned in the rubbing direction.

Figure 7:
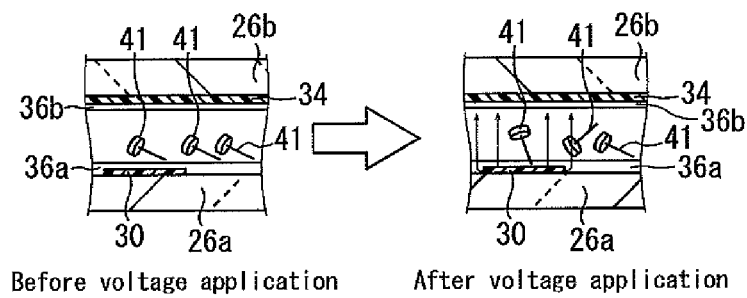
FIG. 7 is an explanatory view for explaining the reason why a luminous region appears.

Accordingly, it is possible to prevent the orientations of the liquid crystal molecules 41 provided at positions that are in the apertures 33 and are in the vicinities of boundaries with the light shield forming electrodes 30 from changing upon application of a voltage. In other words, as shown in FIG. 7, an electric field is applied vertically to the liquid crystal molecules 41 positioned above the light shield forming electrodes 30, while an electric field is applied obliquely to the liquid crystal molecules 41 provided at positions that are in the apertures 33 and are in the vicinities of boundaries with the light shield forming electrodes 30. This is because in the vicinities of the boundaries between the apertures 33 and the light shield forming electrodes 30, the electric field comes around the substrate 26a side, as if entering the same. In the case where the liquid crystal molecules 41 provided at positions that are in the apertures 33 and are in the vicinities of boundaries with the light shield forming electrodes 30 are not aligned in the rubbing direction, the liquid crystal molecules 41 tend to move as the electric field is applied, since the liquid crystal molecules 41 are oriented in the direction in which the electric field comes around. As a result, the orientations of the liquid crystal molecules 41 are reversely tilted and luminous regions occur accordingly.

Figure 8:
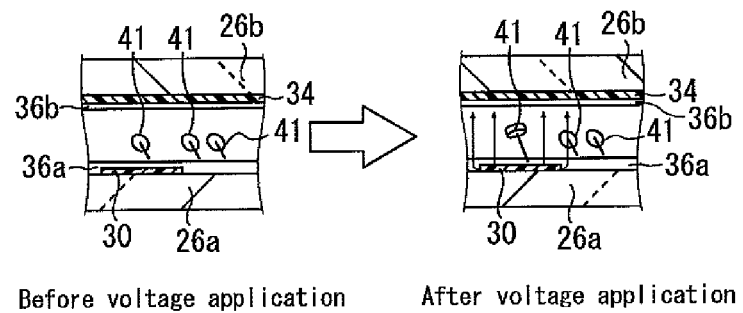
FIG. 8 is an explanatory view for explaining the reason why the luminous region disappears.
Figure 9:
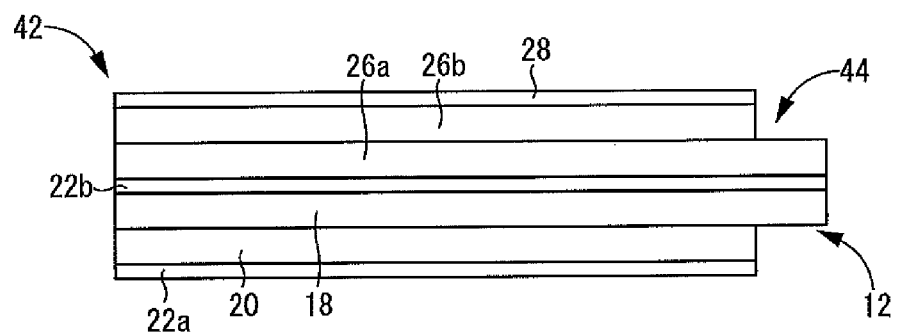
FIG. 9 is a cross-sectional view showing a schematic configuration of a display device as Embodiment 2 of the present invention.

In the case where, however, the liquid crystal molecules 41 provided at positions that are in the apertures 33 and are in the vicinities of boundaries with the light shield forming electrodes 30 are aligned in the rubbing direction, as is the case with the present embodiment, it is possible to prevent the orientations of the liquid crystal molecules 41 from changing upon application of a voltage, as shown in FIG. 8. This is because the liquid crystal molecules 41 are tilted at a greater angle with respect to the direction in which the electric field comes around and therefore do not move as the electric field is applied thereto. Thus, the occurrence of luminous regions can be prevented. This consequently makes it possible to prevent any luminous regions from appearing in the vicinities of boundaries with the light shielding parts 40 in the light transmitting parts 38.

TABLE 1

| | δ1 (degree) | | | | | | | | | | | | | | | | | | | |
|---|---|---|---|---|---|---|---|---|---|---|---|---|---|---|---|---|---|---|---|---|
| | 0 | 5 | 10 | 15 | 20 | 25 | 27 | 30 | 35 | 40 | 45 | 50 | 55 | 60 | 65 | 70 | 75 | 80 | 85 | 90 |
| Luminous region | o | o | o | o | o | o | o | o | o | o | o | x | x | x | x | x | x | x | x | x |

Table 1 shows whether or not any luminous regions appear as the angle δ1 formed between the reference line L1 extending in the rubbing direction for the alignment film 36a and the reference line L2 extending in the lengthwise direction of the light shield forming electrodes 30 is varied in a range of 0° to 90°. It should be noted that in Table 1 "o" means that no luminous region appears, and "x" means that a luminous region appears. In Table 1, "δ1" indicates the smaller angle, among the angles formed between the reference line L1 extending in the rubbing direction for the alignment film 36a and the reference line L2 extending in the lengthwise direction of the light shield forming electrodes 30.

According to Table 1, it is possible to prevent the appearance of a luminous region, by setting the angle δ1 in a range of 0 to 45°, the angle δ1 being formed between the reference line L1 extending in the rubbing direction for the alignment film 36a and the reference line L2 extending in the lengthwise direction of the light shield forming electrodes 30.

In this display device 10, the counter electrode 34 is formed over an entirety of the region where the parallax barrier 16 is to be displayed. This configuration allows the counter electrode 34 to be formed easily.

Further, in the display device 10, the joint electrodes 32 are integrally formed at the ends in the lengthwise direction of the light shield forming electrodes 30, respectively. This configuration makes it possible to reduce the number of lines required for application of a voltage. This consequently allows the switching liquid crystal panel 14 to be manufactured easily.

Further, in the display device 10, a planar image is to be displayed in a state where no voltage is applied, and a stereoscopic image is to be displayed in a state where a voltage is applied. This configuration makes it possible to reduce power consumption.

[Embodiment 2]

Next, Embodiment 2 of the present invention relating to a display device is explained based on FIGS. 9 to 15. It should be noted that members and portions having the same configurations as those in Embodiment 1 are denoted by the same reference numerals as those in Embodiment 1 in the drawings, and detailed descriptions of the same are omitted in the following explanation.

The display device 42 of the present embodiment has a configuration in which the positions of the active matrix substrate 18 and the counter substrate 20 of the display main panel 12 are opposite, as compared with the display device 10 of Embodiment 1. The size and shape of the polarizer 22b are approximately identical to those of the active matrix active 18. This makes it possible to ensure a larger bonding area between the active matrix substrate 18 and the polarizer 22b, as well as a larger bonding area between the polarizer 22b and the substrate 26a. This consequently makes it possible to improve the strength of the display device 42.

Further, the display device 42 has a switching liquid crystal panel 44 that is different from the switching liquid crystal panel in the display device 10 of Embodiment 1. More specifically, as shown in FIG. 12, only ends on one side in the lengthwise direction of the light shield forming electrodes 30 are formed integrally with the joint electrode 32.

Figure 10:
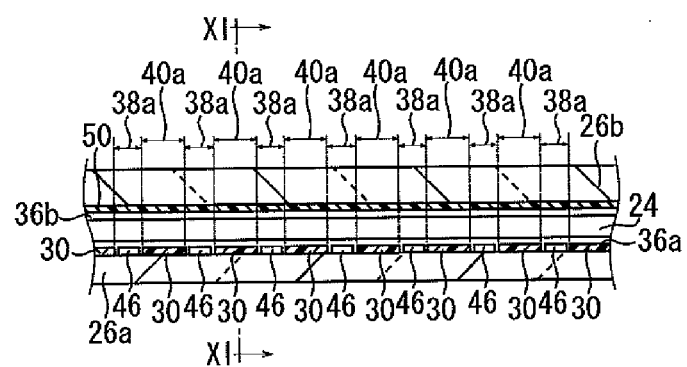
FIG. 10 is a cross-sectional view of a display device shown in FIG. 9, taken along, and viewed in the direction indicated by, an arrow line X-X shown in FIG. 11.
Figure 12:
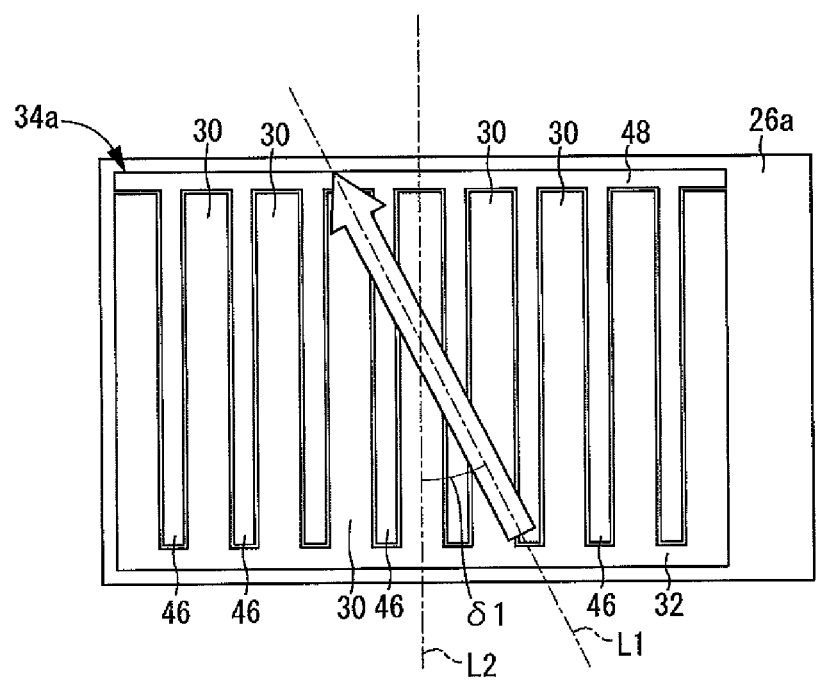
FIG. 12 is a plan view showing relationship between electrodes provided on one substrate as a component of the display device shown in FIG. 9 and a rubbing direction for an alignment film.

Further, as shown in FIGS. 10 and 12, an auxiliary electrode 46 is formed in each space between adjacent two of the plurality of the light shield forming electrodes 30. Each auxiliary electrode 46 is formed so as to extend in the vertical direction of the substrate 26a, in an approximately uniform width. Each auxiliary electrode 46 consequently has a rectangular shape that is long in the vertical direction as a whole.

The plurality of auxiliary electrodes 46 thus arranged are integrated with joint electrode 48, at ends in the other side in the lengthwise direction, the joint electrode 48 being formed in an approximately uniform width each and extending in the horizontal direction of the substrate 26a. Thus, the auxiliary electrodes 46 and the joint electrode 48 are connected electrically.

As each of the auxiliary electrodes 46 and the joint electrode 48, a conventionally known ITO film can be used.

Figure 11:
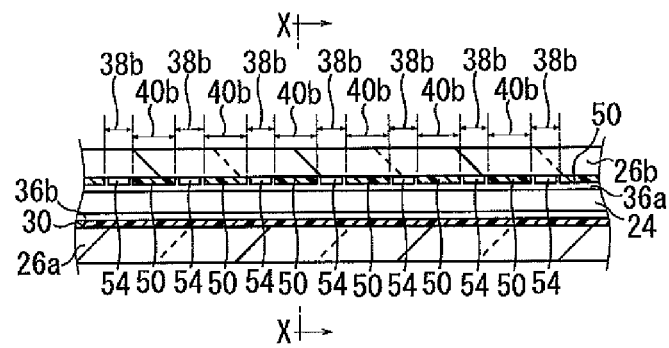
FIG. 11 is a cross-sectional view of a display device shown in FIG. 9, taken along, and viewed in the direction indicated by, an arrow line XI-XI shown in FIG. 10.
Figure 13:
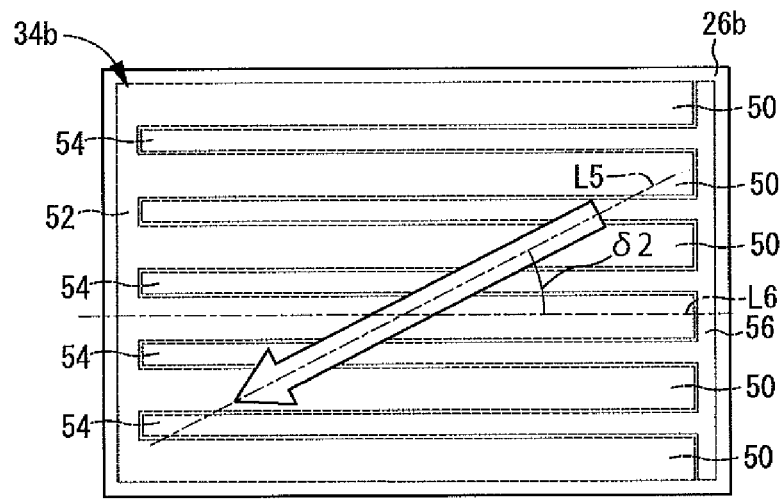
FIG. 13 is a plan view showing relationship between an electrode provided on the other substrate as a component of the display device shown in FIG. 9 and a rubbing direction for an alignment film.

Further, as shown in FIGS. 11 and 13, a plurality of light shield forming electrodes 50 are formed on the substrate 26b as well. Each light shield forming electrode 50 is formed so as to extend in the horizontal direction of the substrate 26b, in an approximately uniform width. In other words, each light shield forming electrode 50 extends in the direction orthogonally crossing the lengthwise direction of the light shield forming electrodes 30 on the substrate 26a. Each light shield forming electrode 50 has a transversely long rectangular shape as a whole.

A plurality of the light shield forming electrodes 50 are arranged at equal intervals in the vertical direction of the substrate 26b. At ends on one side in the lengthwise direction of the light shield forming electrodes 50, joint electrode 52 are integrally formed, each of which extends in the vertical direction of the substrate 26b in an approximately uniform width. Thus, the light shield forming electrodes 50 and the joint electrode 52 are connected electrically.

As each of the light shield forming electrodes 50 and the joint electrode 52, a conventionally known ITO film can be used.

An auxiliary electrode 54 is formed in each space between adjacent two of the plurality of the light shield forming electrodes 50. Each auxiliary electrode 54 is formed so as to extend in the horizontal direction of the substrate 26b, in an approximately uniform width. Each auxiliary electrode 54 consequently has a rectangular shape that is long in the horizontal direction as a whole.

The plurality of auxiliary electrodes 54 thus arranged are integrated with joint electrode 56 at ends on the other side in the lengthwise direction, respectively, the joint electrode 56 being formed in an approximately uniform width each and extending in the vertical direction of the substrate 26b. Thus, the auxiliary electrodes 54 and the joint electrode 56 are connected electrically.

As each of the auxiliary electrodes 54 and the joint electrode 56, a conventionally known ITO film can be used.

An angle $\delta 2$ formed between a reference line L5 extending in a rubbing direction for the alignment film 36b on the substrate 26b on which the light shield forming electrodes 50 are formed and a reference line L6 extending in the lengthwise direction of the light shield forming electrode 50 is set at 27°.

In this display device 42, two types of parallax barriers 16a and 16b can be displayed by application of a driving voltage to the switching liquid crystal panel 44.

Figure 14:
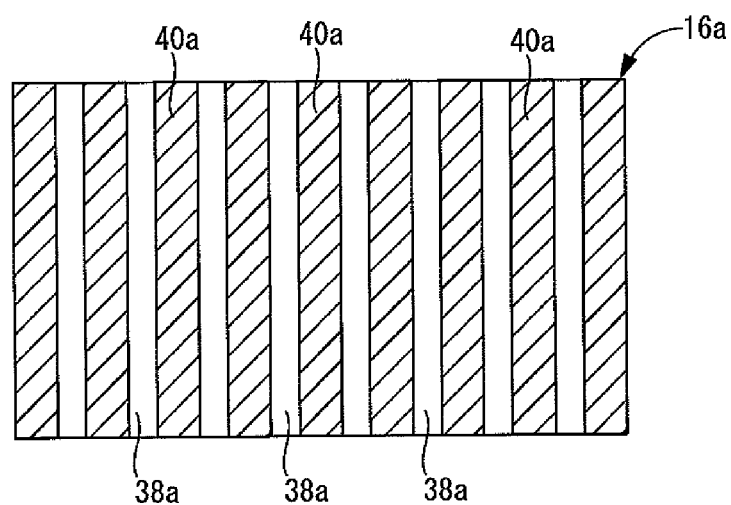
FIG. 14 is an explanatory view showing a parallax barrier displayed by the switching liquid crystal panel of the display device shown in FIG. 9.

A case where the parallax barrier 16a as shown in FIG. 14 is displayed on the switching liquid crystal panel 44 is explained first. In the parallax barrier 16a, the light transmitting parts 38a and the light shielding parts 40a are formed so as to be arranged alternately in the long side direction of the substrates 26a and 26b (the transverse direction of FIGS. 12 and 13). The orientations of liquid crystal molecules positioned between the light shield forming electrodes 30 and the counter electrode 34b (see FIG. 13) change when a driving voltage is applied to the switching liquid crystal panel 44 so as to cause all of the electrodes on the substrate 26b (the plurality of the light shield forming electrodes 50 and the joint electrode 52, as well as the plurality of the auxiliary electrodes 54 and the joint electrode 56) and the plurality of the auxiliary electrodes 46 and the joint electrode 48 provided on the substrate 26a to have the same potential (e.g., 0 V), and to cause the plurality of the light shield forming electrodes 30 and the joint electrode 32 to have a potential (e.g., 5 V) different from the potential of all of the electrodes provided on the substrate 26b (the plurality of the light shield forming electrodes 50 and the joint electrode 52, as well as the plurality of the auxiliary electrodes 54 and the joint electrode 56) and the plurality of auxiliary electrodes 46 and the joint electrode 48 provided on the substrate 26a. This causes the parallax barrier 16a in a stripe form as shown in FIG. 13 to be displayed on the switching liquid crystal panel 44. As is clear from the above explanation, in the present embodiment, the plurality of the light shield forming electrodes 50 and the joint electrode 52 as well as the plurality of auxiliary electrodes 54 and the joint electrode 56 function as the counter electrode 34b.

Here, in the present embodiment, an angle $\delta 1$ formed between a reference line L1 extending in a rubbing direction (a direction indicated by a void arrow mark shown in FIG. 12) for the alignment film 36a and a reference line L2 extending in the lengthwise direction of the light shield forming electrode 30 is set at 27°. This makes it possible to prevent a luminous region from appearing in the vicinities of boundaries with the light shielding parts 40a in the light transmitting parts 38a, in the case where the parallax barrier 16a is displayed on the switching liquid crystal panel 44.

Figure 15:
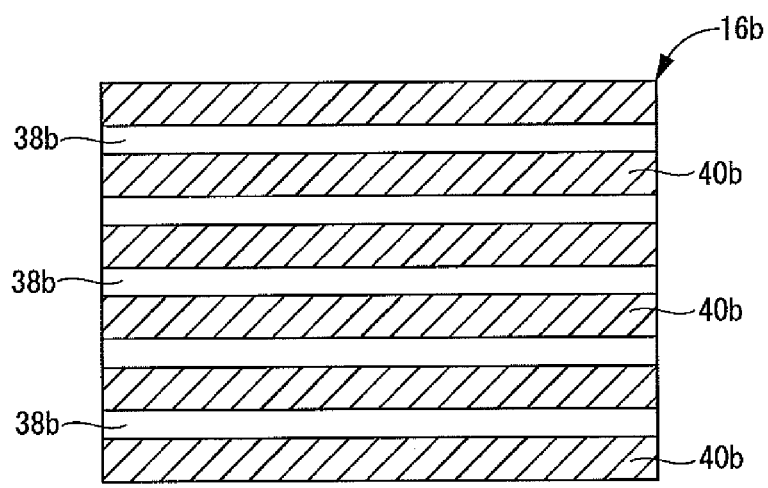
FIG. 15 is an explanatory view showing another parallax barrier displayed by the switching liquid crystal panel of the display device shown in FIG. 9.

Next, a case where the parallax barrier 16b as shown in FIG. 15 is displayed is explained. In the parallax barrier 16b, the light transmitting parts 38b and the light shielding parts 40b are formed so as to be arranged alternately in the short side direction of the substrates 26a and 26b (the longitudinal direction of FIGS. 12 and 13). The orientations of liquid crystal molecules positioned between the light shield forming electrodes 50 and the counter electrode 34a (see FIG. 12) change when a driving voltage is applied to the switching liquid crystal panel 44 so as to cause all of the electrodes on the substrate 26a (the plurality of the light shield forming electrodes 30 and the joint electrode 32, as well as the plurality of the auxiliary electrodes 46 and the joint electrode 48) and the plurality of auxiliary electrodes 54 and the joint electrode 56 provided on the substrate 26b to have the same potential (e.g., 0 V), and to cause the plurality of the light shield forming electrodes 50 and the joint electrode 52 on the substrate 26b to have a potential (e.g., 5 V) different from the potential of all of the electrodes on the substrate 26a (the plurality of the light shield forming electrodes 30 and the joint electrode 32, as well as the plurality of the auxiliary electrodes 46 and the joint electrode 48) and the plurality of auxiliary electrodes 54 and the joint electrode 56 provided on the substrate 26b. This causes the parallax barrier 16b in a stripe form as shown in FIG. 15 to be displayed on the switching liquid crystal panel 44. As is clear from the above explanation, in the present embodiment, the plurality of the light shield forming electrodes 30 and the joint electrode 32 as well as the plurality of the auxiliary electrodes 46 and the joint electrode 48 function as the counter electrode 34a.

Here, in the present embodiment, the angle δ2 formed between the reference line L5 extending in the rubbing direction (the direction indicated by a void arrow mark in FIG. 13) for the alignment film 36b and the reference line L6 extending in the lengthwise direction of the light shield forming electrode 50 is set at 27°. This makes it possible to prevent any luminous regions from appearing in the vicinities of boundaries with the light shielding parts 40b in the light transmitting parts 38b, in the case where the parallax barrier 16b is displayed on the switching liquid crystal panel 44.

TABLE 2

| | δ2 (degree) | | | | | | | | | | | | | | | | | | |
|---|---|---|---|---|---|---|---|---|---|---|---|---|---|---|---|---|---|---|---|
| | 0 | 5 | 10 | 15 | 20 | 25 | 27 | 30 | 35 | 40 | 45 | 50 | 55 | 60 | 65 | 70 | 75 | 80 | 85 | 90 |
| Luminous region | o | o | o | o | o | o | o | o | o | o | o | x | x | x | x | x | x | x | x | x |

Table 2 shows whether or not any luminous regions appear as the angle δ2 formed between the reference line L5 extending in the rubbing direction for the alignment film 36b and the reference line L6 extending in the lengthwise direction of the light shield forming electrodes 50 is varied in a range of 0° to 90°. It should be noted that in Table 2 "o" means that no luminous region appears, and "x" means that a luminous region appears. In Table 2, "δ2" indicates the smaller angle, among the angles formed between the reference line L5 extending in the rubbing direction for the alignment film 36b and the reference line L6 extending in the lengthwise direction of the light shield forming electrodes 50.

According to Table 2, it is possible to prevent the appearance of a luminous region, by setting the angle δ2 in a range of 0 to 45°, the angle δ2 being formed between the reference line L5 extending in the rubbing direction for the alignment film 36b and the reference line L6 extending in the lengthwise direction of the light shield forming electrodes 50.

With this display device 42, it is possible to display a stereoscopic image (to show a stereoscopic image to an observer) in both of the case where the long side direction of the substrates 26a and 26b is directed in the longitudinal direction, and the case where the short side direction thereof is directed in the longitudinal direction.

The plurality of the auxiliary electrodes 46 and 54 are joined by the joint electrodes 48 and 56, and the plurality of the light shield forming electrodes 30 and 50 are joined by the joint electrodes 32 and 52. This allows the number of lines required for application of a voltage to be reduced.

So far the embodiments of the present invention have been described in detail, but these are merely examples, and do not limit the present invention at all.

For example, in Embodiments 1 and 2, the switching liquid crystal panel 14 or 44 may be arranged between the display main panel 12 and the backlight.

Further, in the present invention, a plasma display panel (PDP), an organic electroluminescence (EL) panel, or the like may be used as the display main panel.

Still further, the present invention is of course applicable to a display device on which different images are seen in the case where a display screen thereof is watched in a left oblique direction and in the case where the display screen is watched in a right oblique direction.

The invention claimed is:

1. A switching liquid crystal panel capable of displaying a parallax barrier in a stripe form in which light transmitting parts that transmit light and light shielding parts that block light are formed alternately, the switching liquid crystal panel comprising:
 a pair of substrates;
 a twisted nematic type liquid crystal layer interposed between the pair of the substrates;
 a counter electrode formed on one of the pair of the substrates;
 a plurality of light shielding part forming electrodes formed on the other one of the pair of the substrates, the light shielding part forming electrodes forming the light shielding parts in cooperation with the counter electrode when a voltage is applied; and
 alignment films provided on the pair of the substrates, respectively,
 wherein a rubbing direction for the alignment film on the substrate having the light shielding part forming electrodes thereon is at an angle of 45° or less to a lengthwise direction of the light shielding part forming electrodes.

2. The switching liquid crystal panel according to claim 1, wherein the plurality of the light shielding part forming electrodes are connected with one another at least at each of ends thereof on one side in the lengthwise direction.

3. The switching liquid crystal panel according to claim 1, wherein the counter electrode is formed over an entirety of a region where the parallax barrier is displayed on the substrate.

4. The switching liquid crystal panel according to claim 1, wherein a plurality of the light shielding part forming electrodes are formed on each of the pair of the substrates, and
 the light shielding part forming electrodes formed on one of the pair of the substrates, and the light shielding part forming electrodes formed on the other one of the pair of the substrates, when being projected in the direction in which the pair of the substrates are opposed, cross orthogonally in the projections.

5. The switching liquid crystal panel according to claim 4, wherein a plurality of auxiliary electrodes are formed on each of the pair of the substrates in such a manner that the auxiliary electrodes and the light shielding part forming electrodes are arranged alternately, and
 the counter electrode formed on the other one of the substrates so as to form the light shielding parts in cooperation with the light shielding part forming electrodes formed on the one of the substrates includes the light shielding part forming electrodes and the auxiliary electrodes formed on the other one of the substrates.

6. The switching liquid crystal panel according to claim 5, wherein, in each of the pair of the substrates,
 the plurality of the light shielding part forming electrodes are connected with one another at their ends on one side in the lengthwise direction, and the plurality of the auxiliary electrodes are connected with one another at their ends on the other side in the lengthwise direction.

7. A display device comprising:
the switching liquid crystal panel according to claim 1; and
a display main panel for displaying an image.

8. The display device according to claim 7, wherein the display main panel is a transmission-type liquid crystal panel.

* * * * *